United States Patent [19]
Greco et al.

[11] Patent Number: 6,098,788
[45] Date of Patent: Aug. 8, 2000

[54] CASTING OF COMPLEX MICROMECHANICAL OBJECTS

[75] Inventors: Nancy Anne Greco, Lagrangeville; Ernest Norman Levine, Poughkeepsie; Michael F. Lofaro, Marlboro, all of N.Y.; James Gardner Ryan, Newtown, Conn.

[73] Assignee: International Business Machines Corporation, Armonk, N.Y.

[21] Appl. No.: 08/926,401

[22] Filed: Sep. 9, 1997

[51] Int. Cl.⁷ .................................................. B65G 33/00
[52] U.S. Cl. ............................................. 198/657; 428/137
[58] Field of Search ............................ 198/657; 428/133, 428/137, 139, 603, 174, 597; 216/2, 67, 99, 11

[56] References Cited

U.S. PATENT DOCUMENTS 4,740,410  4/1988  Muller et al. ............................ 428/133
5,785,800  7/1998  Natarajan et al. ....................... 428/137

*Primary Examiner*—Kenneth W. Noland
*Attorney, Agent, or Firm*—Alison D. Mortinger; Jay H. Anderson

[57] ABSTRACT

A seamless micromechanical object is cast by forming a multilevel mold, filling the mold, and selectively removing the mold with respect to the micromechanical object. The mold can have a first level having a first opening therein, and a second level on the first level, the second level having a second opening therein, the second opening smaller than the first opening. The object may contain a controlled void, for example a micromechanical auger with a void formed therethrough to be used as a capillary to drain off fluids when the auger is in use.

9 Claims, 2 Drawing Sheets

CASTING OF COMPLEX MICROMECHANICAL OBJECTS

FIELD OF THE INVENTION

This invention is directed to micromechanical objects, and more particularly to the manufacture of such objects using a casting method.

BACKGROUND OF THE INVENTION

Complex micromechanical objects (also called microstructures or micro miniature objects, and not necessarily entirely mechanical in nature) consisting of multiple layers are typically formed layer by layer with single-layer molds and a deposition or fill step for each layer. A micromechanical object made in such a manner contains seams or interfaces where two layers contact each other. These interfaces are a structural weakness and can cause failure during operation.

Thus, there remains a need for a seamless complex micromechanical object, and a method for creating one.

SUMMARY OF THE INVENTION

It is therefore an object of the present invention to provide a seamless complex micromechanical object.

It is a further object to provide a method for creating a seamless complex micromechanical object.

In accordance with the above listed and other objects, a seamless micromechanical object is cast by forming a multilevel mold, filling the mold, and selectively removing the mold with respect to the micromechanical object. The mold can have a first level having a first opening therein, and a second level on the first level, the second level having a second opening therein, the second opening smaller than the first opening. The object may contain a controlled void, for example a micromechanical auger with a void formed therethrough to be used as a capillary to drain off fluids when the auger is in use.

BRIEF DESCRIPTION OF THE DRAWINGS

These and other features, aspects, and advantages will be more readily apparent and better understood from the following detailed description of the invention, in which.

DESCRIPTION OF THE PREFERRED EMBODIMENTS

The present invention is described herein in the context of semiconductor processing merely as a specific example, and is not meant to limit applicability of the invention to semiconductor technology. Those skilled in the art will understand that the invention is broadly applicable to the formation of any micromechanical or micro miniature object.

Figure 1A:
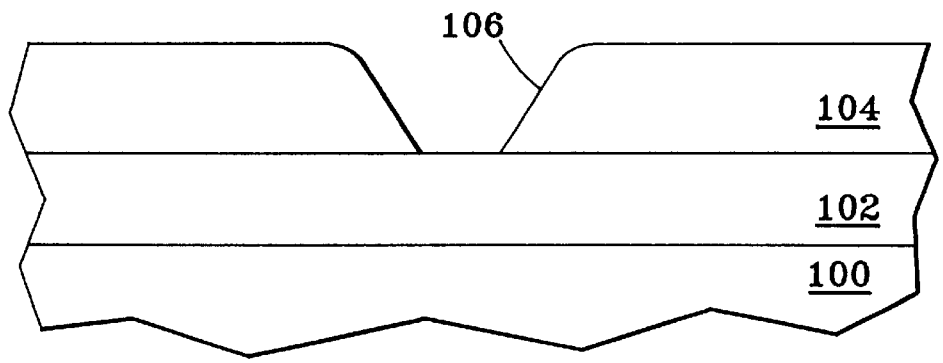
FIGS. 1a–1e are sectional views of the steps for forming a micromechanical auger.
Figure 1B:
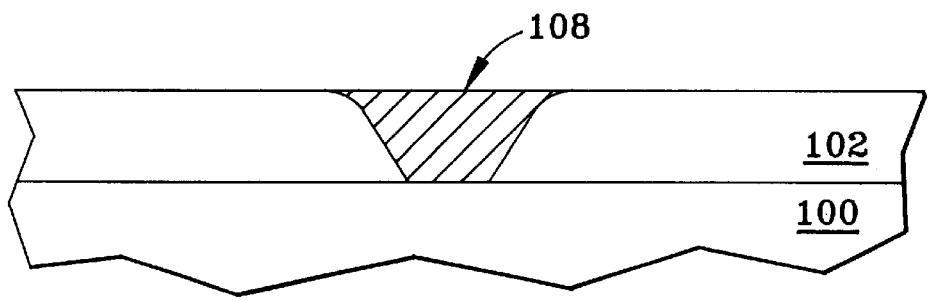

Referring now to the drawings and more particularly to FIGS. 1a–1e, sectional views of the steps for forming a micromechanical auger are shown. In FIG. 1a, a substrate 100 has formed thereon a first level of mold material 102. A layer of photoresist 104 has been patterned and reflowed to create a curved edge 106. In FIG. 1b, the pattern from photoresist 104 has been transferred to mold level 102 for example by a directional etch process such as reactive ion etching (RIE). Disposable material 108 is used to fill the opening in layer 102 and any excess removed for example by chemical mechanical planarization (CMP).

Figure 1C:
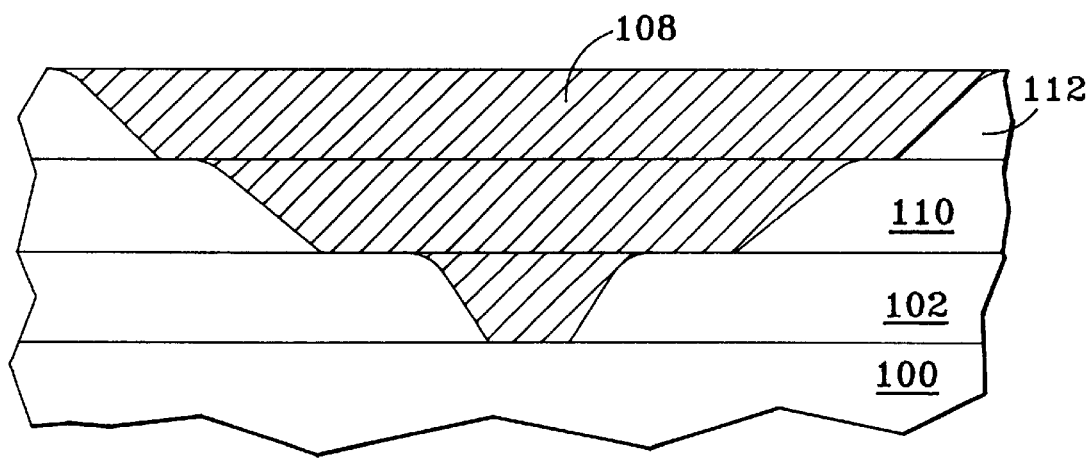
Figure 1D:
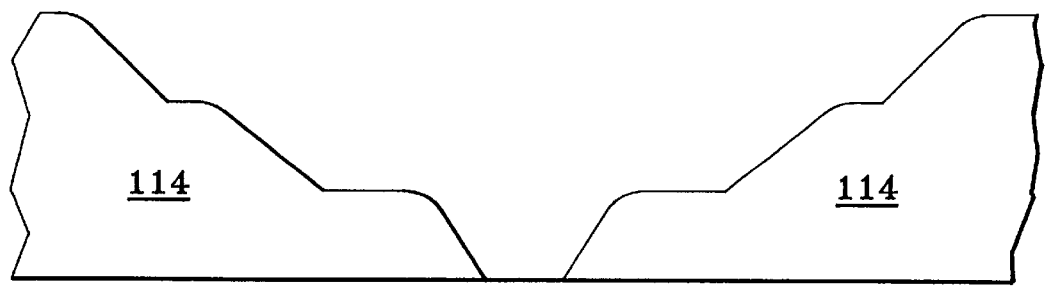
Figure 1E:
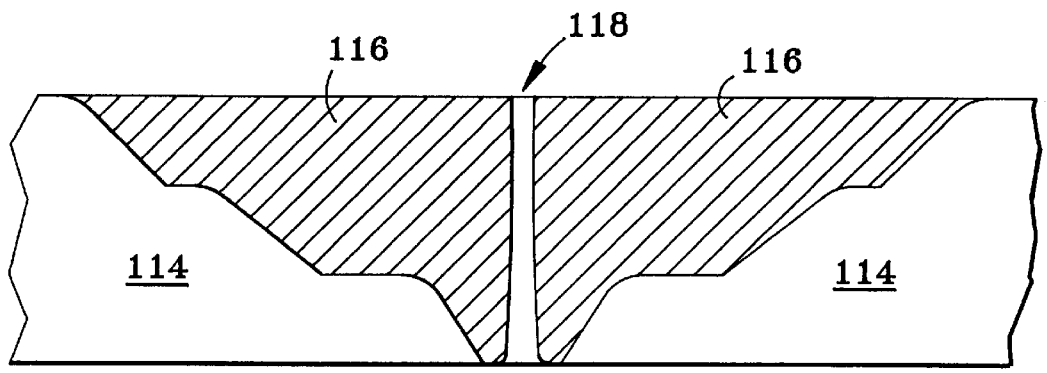

In FIG. 1c, the steps illustrated in FIGS. 1a and 1b are repeated to create additional mold levels 110 and 112, also filled with disposable material 108. Note that it is not necessary to fill the last (topmost) layer with disposable material, because no subsequent layers will need to be supported prior to patterning. In FIG. 1d, disposable material 108 is selectively removed, leaving the completed mold 114. Mold 114 is filled in FIG 1e to create the auger 116. Preferably, chemical vapor deposition (CVD) is used to fill the mold, because a void 118 will form through the center of the auger from one end to the other due to the fill characteristics of the CVD process. Void 118 can then be used as a capillary to drain off fluids or for the addition of fluids such as a coolant or etchant when the auger is in use. Any excess material is removed from the top of the mold for example by CMP or RIE. The auger is then released from the mold using a suitable selective etch process.

Figure 2:
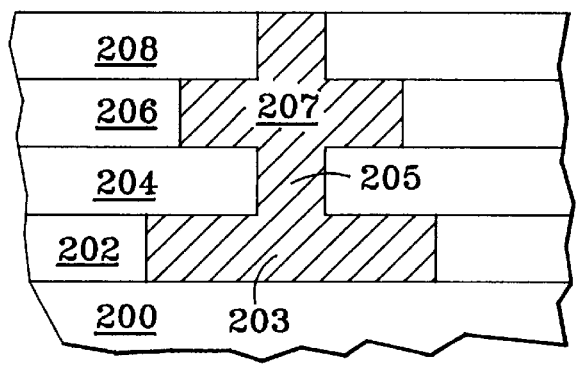
FIG. 2 is a sectional view of an alternate shape mold.

FIG. 2 shows a sectional view of an alternate shape mold. A substrate 200 has first mold level 202 formed thereon, followed by mold levels 204, 206, and 208. The mold levels are formed in a manner similar to FIGS. 1a–1d. Note that first mold level 202 forms an opening 203 that is larger than opening 205 formed by second mold level 204. Stated another way, first mold level 202 is smaller than second mold level 204. Third mold level 206 is smaller than second mold level 204, with level 206 forming an opening 207 larger than opening 205 formed by level 204.

Figure 3:
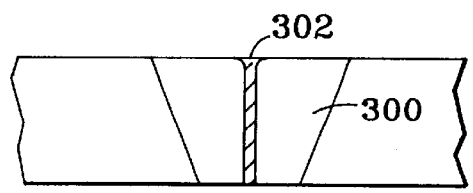
FIG. 3 is a sectional view of a micromechanical object with a filled void; all in accordance with the present invention.

FIG. 3 shows a micromechanical object 300 with a void that has been filled with a solid material 302. Fill material 302 can be used to change the physical strength of object 300, for example adding tungsten fill to an object made of oxide. Fill material 302 can also be conductive so that current can be applied through the object, for example adding copper fill to an object made of diamond-like carbon (DLC). In this particular example, the copper would be a microwire surrounded by a DLC insulator.

It is apparent that all types of complex micromachine structures can be formed in this way, without seams, and optionally with a controlled void, as the multilayer mold is first formed with multiple steps and then filled in one step. the invention has been described in terms of specific embodiments, it is evident in view of the foregoing description that numerous alternatives, modifications and variations will be apparent to those skilled in the art. Thus, the invention is intended to encompass all such alternatives, modifications and variations which fall within the scope and spirit of the invention and the appended claims.

What is claimed is:

1. A method for casting a micromechanical object, comprising the steps of:
    forming a multilevel mold;
    filling the mold to create a seamless micromechanical object; and
    selectively removing the mold with respect to the micromechanical object,
    wherein the multilevel mold is filled by a method designed to produce a controlled void in the micromechanical object.

2. The method of claim 1 wherein the multilevel mold comprises:

a first level having a first opening therein; and a second level on the first level, the second level having a second opening therein, the second opening smaller than the first opening.

3. The method of claim 2 wherein the multilevel mold further comprises a third level on the second level, the third level having an opening larger than the second opening.

4. The method of claim 1 wherein the formation of the multilevel mold comprises the steps of:

forming a layer of mold material;

patterning the layer of mold material to form an opening therein;

filling the opening with disposable material;

removing any excess material that exceeds the height of the layer of mold material; and repeating the forming, patterning, filling and removing steps to form subsequent levels of the mold.

5. The method of claim 4 further comprising, for the topmost level of the mold, the steps of:

forming a layer of mold material; and patterning the layer of mold material to form an opening therein.

6. The method of claim 1 wherein the fill method is chemical vapor deposition.

7. The method of claim 1 further comprising the step of filling the controlled void with a fill material.

8. The method of claim 1 wherein the micromechanical object is a micromechanical auger, and the multilevel mold has a plurality of levels increasing in size from a first end of the auger to a second end of the auger.

9. The method of claim 8 further comprising the step of filling the mold by chemical vapor deposition such that a void is formed from the first end of the auger to the second end of the auger.

* * * * *